United States Patent [19]
Uchiyama et al.

[11] 3,941,572
[45] Mar. 2, 1976

[54] PROCESS FOR GAS-ABSORPTION AND DUST-REMOVAL

[75] Inventors: Hisashi Uchiyama; Naohiko Meno, both of Hamamatsu; Teizo Senjo, Machida; Makio Kobayashi, Toyonaka, all of Japan

[73] Assignees: Sumitomo Metal Industries, Ltd., Osaka; Fuji Kasui Engineering Co., Ltd., Tokyo, both of Japan

[22] Filed: Oct. 21, 1974

[21] Appl. No.: 516,578

Related U.S. Application Data

[63] Continuation of Ser. No. 344,502, July 25, 1972, abandoned.

[30] Foreign Application Priority Data
July 25, 1972   Japan............................. 47-74358

[52] U.S. Cl. ............................. 55/90; 55/84; 55/87; 261/113
[51] Int. Cl.².......................................... B01D 47/00
[58] Field of Search ................. 55/84, 87, 90, 233; 261/113

[56] References Cited
OTHER PUBLICATIONS

Chem. Abstracts, Vol. 64, 1966, 18980f.
Chem. Abstracts, Vol. 64, 1966, 19007a.
Chem. Abstracts, Vol. 64, 1966, 12202c.
Chem. Abstracts, Vol. 75, 1971, 50922w.
Chem. Abstracts, Vol. 59, 1963, 14916h.

*Primary Examiner*—Frank A. Spear, Jr.
*Assistant Examiner*—Ferris H. Lander
*Attorney, Agent, or Firm*—Armstrong, Nikaido & Wegner

[57] ABSTRACT

A process for gas-absorption and dust-removal with an excellently high rate and capacity is provided wherein gas containing a specific gas component to be absorbed and/or fine dust to be removed is passed upwardly through a perforated plate or grid plate tower without weir and downcomer having a free-space ratio of 0.25 – 0.60, where said gas is contacted countercurrently with liquid absorbent under the stated conditions.

3 Claims, 6 Drawing Figures

PROCESS FOR GAS-ABSORPTION AND DUST-REMOVAL

This is a continuation of application Ser. No. 344,502, filed July 25, 1972, now abandoned.

This invention relates to a wet process for removing a specific gas component, such as sulfur dioxide, oxides of nitrogen, hydrogen sulfide or the like, and fine dust or soot from gas, and more particularly, to a wet process for absorbing a specific gas component and/or for collecting fine dust in gas by employing a Moredana plate tower.

The term "Moredana plate tower" as used in this specification means plate tower comprising perforated plate, grid plate or the like without weir and downcomer.

Wet gas-absorption or dust-removal processes are well-known wherein a specific gas component or fine dust from gas containing such specific gas component, vapor component or fine dust is absorbed by bringing the gases into contact with liquid absorbent.

Recently, due to increasing industrial production, harmful gas components and fine dust contained in waste gas or off-gas from various industrial plants have presented serious problems of atmospheric contamination or air pollution. The wet gas-absorption and dust-removal processes play important parts in the solution to these problems.

Typical wet gas-absorption and dust-removal processes include those of the type wherein gas absorbers by liquid drops such as, for example, packed tower, spray scrubber and the like are employed and those of the type wherein gas absorbers by gas foams or bubbles such as, for example, bubble-cap tower, perforated plate or sieve plate tower, grid plate tower and the like are employed.

However, the process employing a packed tower has some defects. That is, channelling of liquid and gas streams in a packed tower are likely to occur, and plugging or blocking generates in a packed tower during operation when gas or liquid contains solid materials, particles or the like. The process employing a spray scrubber also has some defects. That is, a large amount of power is required to spray the liquid, liquid entrainment is likely to occur and absorption capacity is not satisfactory. Moreover, the processes employing these gas absorbers by liquid drops are, in general, not preferred in the case of absorbing gases having a high liquid film resistance.

The processes employing a plate tower such as, for example, bubble-cap towers, perforated plate towers and the like are generally applied when a large scale apparatus is required, when a packed tower cannot be used because of excessively high or low liquid flow rates or when gas or liquid contains solid materials or the like. However, the plate tower also has some defects, that is, pressure drop through the tower is relatively high and plate efficiency of the plate tower is usually low. Moreover, when a plate tower is employed for absorbing gas of a high liquid film resistance, that is, in the absorption of a gas slightly soluble in liquid absorbent, only a low rate of absorption is obtained. Accordingly the tower tends to become large and, in the case of large scale towers, the rate of absorption is still unsatisfactory.

Furthermore, in the conventional industrial absorption processes, superficial gas velocity in tower is usually limited to the range of 0.3 – 2 m/sec. Accordingly in order to treat a large flow rate of gases, a large-sized tower is required. Therefore, development of gas-absorption and dust-removal processes having a high gas capacity has been eagerly desired in the industry.

An object of the present invention is to provide a process for removing a specific gas component and/or fine dust from gas by employing a Moredana plate tower which is capable of removing the specific gas component and/or fine dust with an enhanced efficiency and of treating the gas at a far increased flow rate.

Other objects and advantages of the present invention will be apparent from the following description.

In accordance with the present invention, there is provided a process for removing a specific gas component and/or fine dust from gas, comprising passing said gas containing the specific gas component and/or fine dust upwardly through a plate tower comprising at least one perforated or grid plate without weir and downcomer having a free-space ratio of 0.25 – 0.60 at a superficial gas velocity falling within the undulation region defined hereinafter, while passing liquid absorbent downwardly through said plate tower in countercurrent flow relationship to the upflowing gas under a liquid-gas ratio (L/G) of 0.5 or more.

A gas-absorption and dust-removal process employing a plate tower without weir and downcomer, i.e. Moredana plate tower, is already known. This process has become of major interest lately. This is because this process has the following advantages: uniform gas-liquid contact can be obtained even at a low liquid flow rate; large-sized apparatus can be utilized; pressure drop through a tower is relatively low, and; a gas-liquid system containing solid materials can be advantageously treated. However, in the known process wherein the plate tower without weir and downcomer, is employed, maximum superficial gas velocity in the tower is limited to at most approximately 2 m/sec. Accordingly this process also has a defect in that a large-sized apparatus is required for treating gas at a high flow rate.

Figure 1:
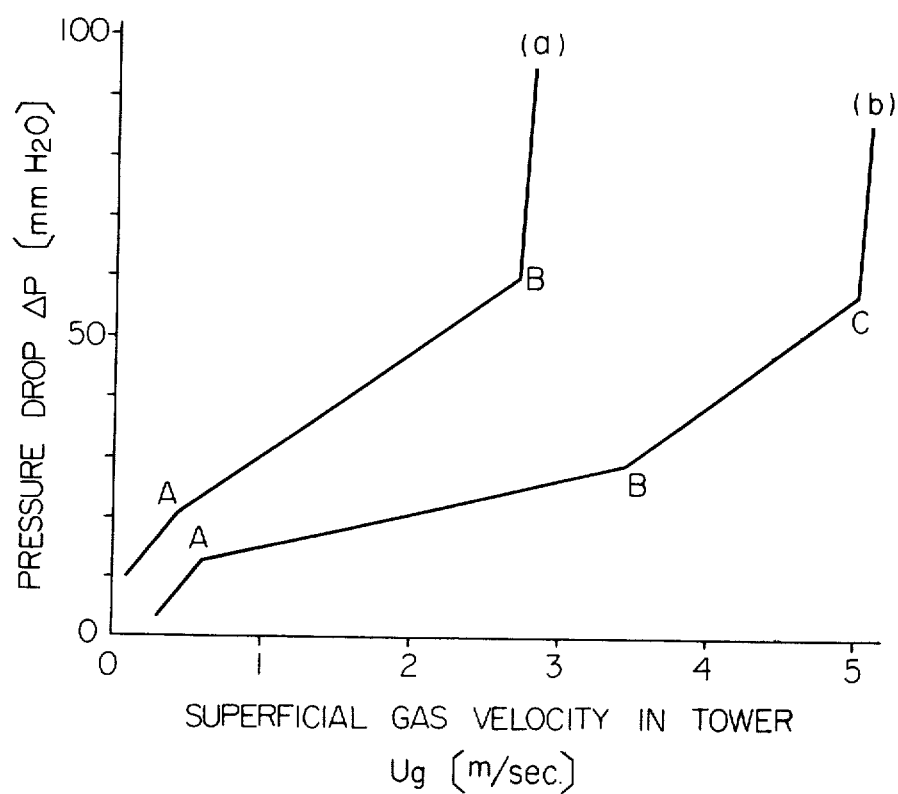
FIG. 1 illustrates curves of pressure drop versus superficial gas velocity in the tower.

For a plate-tower without downcomer, the plot of pressure drop $\Delta P$ through a plate against superficial gas velocity $Ug$ in the tower, in the case of countercurrently contacting gas with liquid, typically gives a straight line with breaks at two points A and B, as shown in curve (a) of FIG. 1. The curve (a) of FIG. 1 shows this plot when the free-space ratio of the plate is 0.20. The point A of curve (a) is the point where the liquid begins to be retained on the plate. When the superficial gas velocity $Ug$ is lower than that of the point A, the liquid falls down through the holes of the plate without being retained on the plate. This state is called weeping. As the superficial gas velocity $Ug$ increases from the point A to the point B, the gas passing through the liquid layer on the plate is, at first, in a bubbling state; and afterwards it changes gradually to a foaming or frothing state. Between the point A and the point B, resistance or pressure drop increases with a relatively gentle slope.

When superficial gas velocity Ug approaches the point B, pressure drop ΔP through the plate and height of the liquid-gas mixture layer on the plate increase rapidly and, finally, flooding occurs. In this flooding state, stable operation can not be performed. Heretofore, the point B has been referred to as "point of maximum permissible gas velocity" and the superficial gas velocity at the point B has been referred to as "maximum permissible gas velocity". Namely, for a plate-tower without downcomer exhibiting the behavior as shown in the curve (a) of FIG. 1, the region between the point A and the point B is a stable working region and the point B substantially corresponds to the flooding point. A plate without downcomer having a free-space ratio (total area of holes in plate/plate area) of approximately 0.08 – 0.20, in general, shows the curve (a) in FIG. 1.

It has been found that the plot of pressure drop ΔP through a plate against superficial gas velocity Ug gives a curve similar to a curve (b) in FIG. 1 when a Moredana plate having a free-space ratio of 0.25 – 0.60 is employed. The curve (b) in FIG. 1 shows the plot of pressure drop ΔP through a plate against superficial gas velocity Ug in the case of a Moredana plate having a free-space ratio of 0.31.

In the curve (b) of FIG. 1, the liquid is retained on the plate at a region exceeding the point A, and pressure drop ΔP gradually increases with an increase of superficial gas velocity Ug between the points A and B, similar to in the curve (a) of FIG. 1. However, in this case flooding does not occur on exceeding the point B, and up to a point C of curve (b) the plot of ΔP against Ug gives a straight line with a little higher slope than that of the line between the points A and B. On approaching the point C the increase of the pressure drop ΔP is rapid and flooding occurs. As it is usually difficult to clearly observe the exact flooding point, the point C may be referred to as flooding point for convenience's sake.

A state of the gas-liquid mixture on the Moredana plate betweeen the points B and C is as follows. In this region the liquid stream and gas stream are mixed effectively on the plate and the group of blocks, each composed of the gas-liquid mixture in a state of foam or froth, is formed on the plate. These blocks move vigorously up and down repeatedly in the liquid-gas layer on the plate. A part of the fallen blocks is broken, and then new blocks are formed and immediately rises. Thus, the mixing of the gas phase and liquid phase can be effectively done, the interfacial area between gas and liquid increases and both liquid laminar film and the liquid-gas interface are renewed incessantly.

Therefore, the region between the points B and C in the curve of the type similar to the curve (b) of FIG. 1 is herein defined as "undulation region", and the point B and the point C are termed "minimum gas velocity of undulation region" and "maximum gas velocity of undulation region", respectively.

Figure 2A:
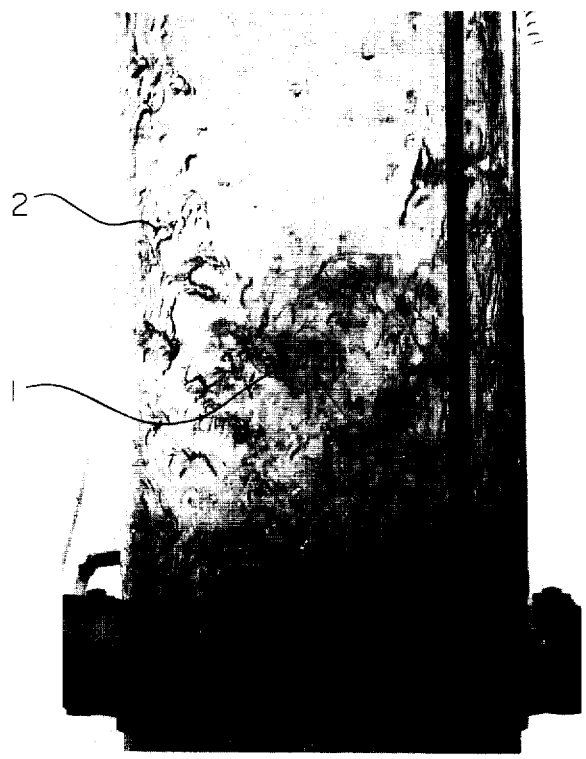
FIGS. 2a–2c are photographs showing the state of gas liquid mixture on the Moredana plate.
Figure 2B:
Figure 2C:
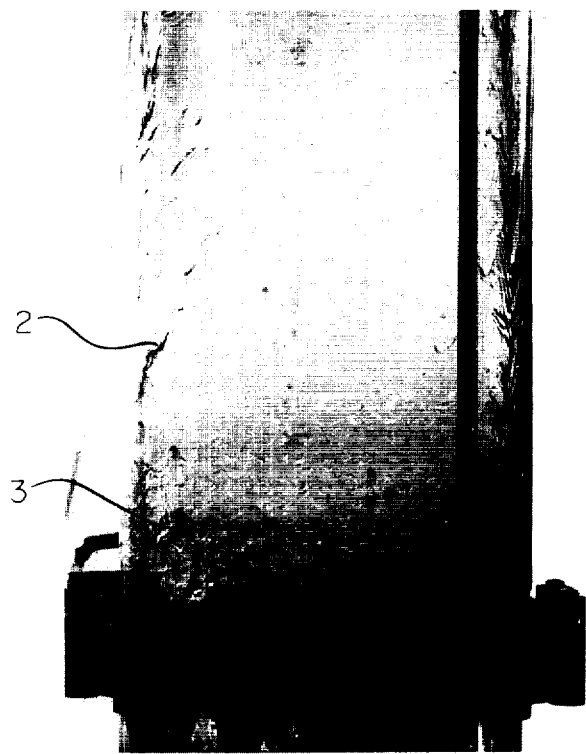

FIGS. 2A, 2B and 2C are photographs showing the state of gas-liquid mixture on the Moredana plate.

FIGS. 2A and 2B show states at a point of Ug 4.0 m/sec positioned in the undulation region, i.e. between the points B and C, in the curve (b) of FIG. 1. FIG. 2C shows a state at a point of Ug 1.8 m/sec positioned in the stable working region, i.e. between the points A and B, in the curve (b) of FIG. 1. As mentioned hereinbefore, in the undulation region the gas-liquid mixture moves up and down repeatedly and furiously in the form of the group of blocks each composed of minute foams or froths. Such block is indicated by reference numeral 1 in FIGS. 2A and 2B and has an appearance similar to a cloud in the photographs. FIGS. 2A and 2B show the moments at which the block 1 is at the highest position and the lowest position, respectively, of the movement of the block.

In contrast, at the point of Ug 1.8 m/sec positioned in the region which has been heretofore called a stable working region, i.e. between the points A and B in the curve (b) of FIG. 1, the gas-liquid mixture is in the state of foaming or frothing, which state is indicated by reference numeral 3 in FIG. 2C. In FIGS. 2A, 2B and 2C, reference numeral 2 indicates liquid moving down along the inner surface of the tower.

It has been found surprisingly that a high rate of gas-absorption and dust-removal is obtained in the case of contacting gas, containing a specific gas component and/or fine dust, with liquid absorbent countercurrently in this undulation region, i.e. the region between the points B and C in the curve (b) of FIG. 1.

It depends particularly upon a free-space ratio of the plate, as well as physical properties of gas-liquid mixture and flow rate of gas and liquid, whether the hydrodynamic relation as shown in the curve (b) of FIG. 1 appears or not. This will be understood by the explanation given below which illustrates the relation between the liquid flow rate L (kg/m².hr) and the free-space ratio of Moredana plate. This relation results in a relatively wide undulation region similar to the region between the points B and C in the curve (b) of FIG. 1. In this exemplification sulfur dioxide ($SO_2$) was scrubbed with an aqueous sodium carbonate ($Na_2CO_3$) solution by using various Moredana plates each having a different freespace ratio.

Firstly in the Moredana plate tower, comprising three perforated plates each having a free-space ratio of 0.31, the undulation region $\overline{BC}$ in the curve (b) of FIG. 1 resulted under a liquid flow rate of 9,000 – 110,000 kg/m²·hr. 95 – 99% of $SO_2$ was absorbed by aqueous $Na_2CO_3$ solution at the liquid flow rate above 10,700 kg/m²·hr, and the superficial gas velocity between the points B and C. However, when the liquid flow rate was less than 9,000 kg/m²·hr, the rate of absorption was 90 – 88% or less at the superficial gas velocity below the point B, and less than 85% at the superficial gas velocity above the point B. This is because the rate of mass transfer on the plate decreases considerably. Namely suitable liquid hold-up on the plate for mass transfer cannot be obtained due to a relatively low liquid flow rate as compared with the gas flow rate. Especially when the superficial gas velocity exceeded the point B, it was observed that the gas stream flowed directly through the liquid layer on the plate and that the liquid on the plate was splashed upwardly in the form of fine drops by the gas stream. When the liquid flow rate was more than 40,000 kg/m²·hr, the region $\overline{BC}$ appeared, but the value of pressure drop through the one plate was —40 mmH₂O or more. Accordingly these conditions are not always good working conditions. Consequently the range of optimum liquid flow rate (L) is 20,000 – 30,000 kg/m²·hr in the case of the perforated plate having a free-space ratio of 0.31.

Secondly, in the plate of a free-space ratio of 0.25, the undulation region $\overline{BC}$ could not appear at a liquid flow rate exceeding 25,000 kg/m²·hr and a curve similar to the curve (a) of FIG. 1 resulted. When the liquid flow rate was below 9,300 kg/m²·hr, the undulation region $\overline{BC}$ also appeared. However these conditions are not preferable because the rate of absorption decreased remarkably at the superficial gas velocity exceeding the point B. Accordingly, a preferable range of liquid flow rate in the plate of a free-space ratio of 0.25 is between 9,300 and 22,000 kg/m²·hr. This is narrower than that of the plate of a free-space ratio of 0.31 described above.

On the other hand, in the plate of a free-space ratio of 0.20 the undulation region $\overline{BC}$ never appeared at the liquid flow rate (L) exceeding 7,500 kg/m²·hr, and a curve similar to the curve (a) of FIG. 1 resulted. When the liquid flow rate (L) was 5,000 kg/m²·hr, a curve similar to the curve (b) in FIG. 1 was obtained. However, in this case the rate of mass transfer on the plate decreased considerably at the superficial gas velocity exceeding the point B because of lower liquid flow rate. Accordingly these conditions cannot be used practically.

From the above exemplification, minimum free-space ratio of the Moredana plate is considered to be 0.25. Furthermore, for the plate of a free-space ratio exceeding 0.35, the undulation region $\overline{BC}$ always appeared at a liquid flow rate below 60,000 kg/m²·hr, which was considered to be a practical flow rate. However, when the free-space ratio of the plate was more than 0.60, the free-space was so large that it became difficult to hold the liquid layer on the plate. Accordingly the plate having a free-space ratio of more than 0.60 is not practical.

In general, the range of the free-space ratio is from 0.25 to 0.60, preferably between 0.30 and 0.50 for a practical use. When the free-space ratio is lower than 0.25, available range of the liquid flow rate is narrow and pressure drop through the plate undesirably increases. In contrast, when the free-space ratio is higher than 0.60, the undulation region $\overline{BC}$ appears only in the case of excessively high superficial gas velocity and pressure drop through the plate also increases.

The relation between free-space ratios of the Moredana plate and minimum liquid flow rates capable of using the undulation region $\overline{BC}$ effectively is shown in Table 1.

Table 1

| Free-space ratio of the plate | Minimum liquid flow rate (kg/m²·hr) |
|---|---|
| 0.25 | 9,300 |
| 0.31 | 10,700 |
| 0.35 | 11,600 |
| 0.40 | 12,800 |
| 0.45 | 14,000 |
| 0.50 | 15,100 |
| 0.55 | 16,300 |
| 0.60 | 17,100 |

Note: These data were obtained by treating gas containing $SO_2$ with a 5% aqueous $Na_2CO_3$ solution in the perforated Moredana plate under a liquid-gas ratio (L/G) of 0.5.

Heretofore, in order to provide a curve similar to the curve (b) of FIG. 1, it was necessary to reduce the liquid flow rate L because of employing a plate having small free-space ratio. Accordingly rate of mass transfer decreased remarkably at the superficial gas velocity exceeding the maximum permissible gas velocity. Therefore it has been an accepted theory that the rate of mass transfer decreases when the superficial gas velocity exceeds the maximum permissible gas velocity. Further when the liquid flow rate is increased so as to raise the rate of absorption, a curve similar to the curve (a) in FIG. 1 results. Moreover, in this case, the gas-treating capacity of an apparatus is low because of the lower maximum permissible gas velocity, which substantially equals the flooding velocity.

It has been quite unknown that the maximum performance of the Moredana tower is exhibited in the case of the large free-space ratio and the high liquid flow rate as mentioned above.

In the gas-absorption and/or dust-removal process of the invention wherein the undulation region $\overline{BC}$ as shown in the curve (b) of FIG. 1 is employed, the ratio of the liquid absorbent flow rate L (kg/m²·hr) to the gas flow rate G (kg/m²·hr), which ratio is herein referred to as L/G for brevity, is 0.5 or more and preferably 1 – 3 for practical use. When the value of L/G is less than 0.5, the rate of mass transfer decreases at the superficial gas velocity exceeding the minimum undulation velocity, i.e. the point B in the curve (b) of FIG. 1, because of low liquid flow rate and, therefore, a satisfactory rate of absorption cannot be obtained. On the other hand, when L/G goes up to an extremely high value, the pressure drop through the plate becomes higher and the undulation working region becomes narrower. Therefore, maximum L/G is generally limited to approximately 25 for practical use.

The aforesaid points B and C, defining the undulation region for the Moredana plate tower according to the present invention, can be easily determined by experiments. The curve (b) in FIG. 1 was practically determined by experiment, in which a perforated plate is employed at a liquid flow rate of 20,000 kg/m²·hr.

Further, the superficial gas velocity at the point B (Ugm) may be calculated from the following four approximate relations, as mentioned by H. Uchiyama, K. Hirao and N. Meno in Kagaku Kogaku, 35, 116 – 122 (1971):

$$\frac{Ugm}{Fc\sqrt{gl}} = 49.14 Fc^{-0.30} \left(\frac{\rho g}{\rho l} \times 10^3\right)^{-0.5} \left(\frac{L}{G}\right)^{-1/3} \quad (1)$$

$$\frac{Ugm}{Fc\sqrt{gl}} = 40.92 Fc^{-0.30} \left(\frac{\rho g}{\rho l} \times 10^3\right)^{-1.535} \left(\frac{L}{G}\right)^{-1/3} \quad (2)$$

$$\frac{Ugm}{Fc\sqrt{gl}} = 67.8 \left(\frac{L}{G}\right)^{-0.23} \left(\frac{\rho g}{\rho l} \times 10^3\right)^{-0.576} \quad (3)$$

$$\frac{Ugm}{Fc\sqrt{gl}} = 76.7 \left(\frac{L}{G}\right)^{-0.23} \left(\frac{\rho g}{\rho l} \times 10^3\right)^{-1.255} \quad (4)$$

wherein

Ugm = superficial gas velocity at the point B (m/sec)
g = gravitational acceleration (m²/sec)
Fc = free-space ratio of perforated plate and grid plate (–)
L = liquid flow rate (kg/m²·sec)
G = gas flow rate (kg/m²·sec)
pl = liquid density (kg/m³)
pg = gas density (kg/m³)

$$l = \sqrt{\frac{2\sigma}{g\rho l}} = \text{capillary constant (m)}$$

$\sigma$ = surface tension (kg/sec$^2$)

The above equation (1) is applicable to the perforated plate in the case of $Fc \geq 0.16$ and $\rho g \rho l \times 10^3 \geq 0.838$, and the equation (2) is applicable to the perforated plate in the case of $Fc \geq 0.16$ and $\rho g \rho l \times 10^3 \leq 0.838$, the equations (3) and (4) are applicable to perforated plate ($Fc \leq 0.16$) and grid plate, equations (3) and (4) when $\rho g/\rho l \times 10^3 \geq 1.20$ and $\rho g/\rho l \times 10^3 \leq 1.20$, respectively.

Superficial gas velocity $Ugc$ (m/sec) at the point C of the curve (b) in FIG. 1, that is, superficial gas velocity at substantial flooding point, may also be calculated from the following two approximate relations:

$$\frac{Ugc}{Ugm} = 7.509 \times 10^2 \times L^{-0.5704} \quad (5)$$

$$\frac{Ugc}{Ugm} = 3.434 \times L^{-0.0807} \quad (6)$$

Wherein $Ugm$ and $L$ are the same in the equations (1) – (4).

The above equations (5) and (6) are applicable to the Moredana plate used in the present invention, the equation (5) and (6) when $L = 6 \times 10^4 \sim 11 \times 10^4$ kg/m$^2$·hr and $L = 10^4 \sim 6 \times 10^4$ kg/m$^2$·hr, respectively.

The Moredana plate according to the present invention includes a conventional perforated plate, or grid plate composed of cross bars or parallel bars and the like having a free-space ratio of 0.25 – 0.60.

When a perforated plate is employed, the diameter of the holes in the plate is not particularly limited, but it is, in general, 2 – 16 mm, preferably 3 – 10 mm. In the case of a grid plate, the width of the slot or slit is, in general 3 – 10 mm.

In accordance with the present invention, a high rate of gas-absorption or dust-removal can be achieved by contacting gas with liquid countercurrently at a high superficial gas velocity falling within the undulation region BC of the curve (b) in FIG. 1, and at the stated liquid-gas ratio (L/G).

Figure 3:
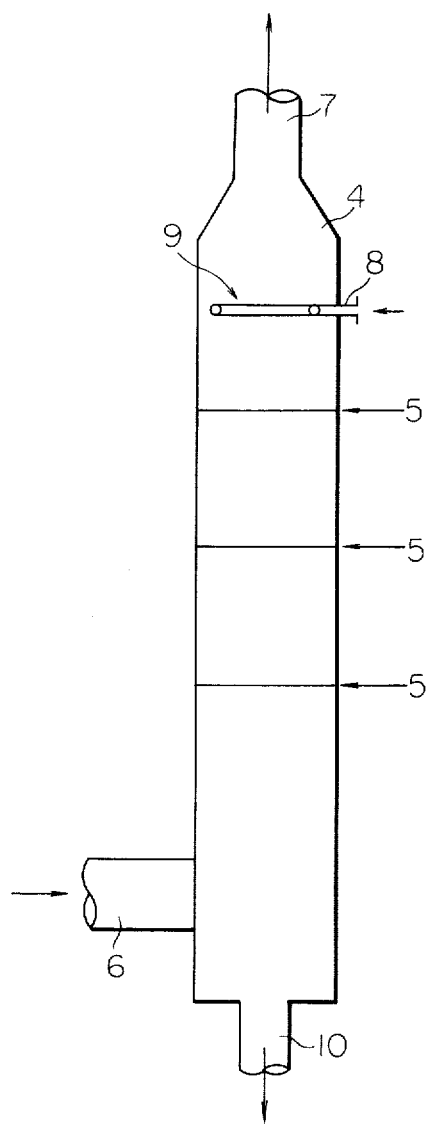
FIG. 3 is a schematic sectional view showing the structure of the Moredana plate tower employed in the present invention.
Figure 4:
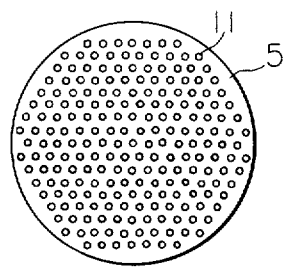
FIG. 4 is a plan view of the Moredana plate of FIG. 3.

Referring to FIGS. 3 and 4, numeral 4 designates a Moredana plate tower which comprises three perforated plates 5 without weir and downcomer. As shown in FIG. 4, the plate 5 has a plurality of holes 11 and its free-space ratio (total area of holes in the plate/plate area) is approximately 0.31. The Moredana plate tower 4 further comprises: a gas inlet 6 for feeding gas to be treated; a gas outlet 7 for discharging the scrubbed gas; a liquid inlet 8 for feeding liquid absorbent; a distributor 9 for uniformly distributing the liquid abosrbent fed through the liquid inlet S over the entire perforated plate, and a liquid outlet 10 for discharging the liquid absorbent.

Further in accordance with the present invention, gas to be treated can be fed into the apparatus for removing specific gas and/or fine dust at the superficial gas velocity which is several times more than that of the conventional process as mentioned above, so that the size of the apparatus can be made several times less than that of the conventional apparatus, and a high economical gas-absorption or dust-removal process can be provided.

Other features of the process of the present invention are as follows. Maintenance service is easy, because there is far less possibility of the plugging of solid materials in the tower due to the simplicity of its structure.

As pressure drop through a tower is relatively low and spraying of liquid absorbent is not necessary, power requirements for the gas blower and liquid pump are small and, therefore, running cost is reduced. As startup or shut down of operation is easy and as a nearly constant rate of gas-absorption or dust-removal can be obtained at a constant liquid flow rate even if gas feed rate is changed, the present process facilitates the operation greatly.

This invention is illustrated by, but by no means limited to, the following examples.

EXAMPLE 1

Gas containing 1,280 ppm sulfur dioxide (SO$_2$) was continuously passed through a Moredana plate tower, comprising three perforated plates having a hole diameter of 5 mm and a free-space ratio of 0.31, where it was treated with 5 wt.% Na$_2$CO$_3$ in a water solution. The Na$_2$CO$_3$ solution fell downwardly in countercurrent flow relationship to the upflowing gas in the tower under the following conditions:

| | |
|---|---|
| Gas flow rate | 18,300 kg/m$^2$.hr |
| Superficial gas velocity in the tower | 3.88 m/sec |
| Gas temperature | 20°C |
| Liquid flow rate | 19,875 kg/m$^2$.hr |
| Liquid temperature | 20°C |

The rate of absorption (the amount of SO$_2$ absorbed × 100/the amount of SO$_2$ fed) obtained by the value of continuous analysis of SO$_2$ in off-gas from the tower was 98.8% or more. During the operation, the height of liquid on the Moredana plate was approximately 31 mm and the total pressure drop through the tower was approximately 90 mmH$_2$O.

A gas absorption test was repeated in the same manner as mentioned above except that a Moredana plate tower, comprising five perforated plates having a hole diameter of 5 mm and a free-space ratio of 0.31, was employed.

The rate of absorption was 99.8% or more, and the total pressure drop through the tower was approximately 150 mmH$_2$O.

Comparative Example 1

Gas containing 1,340 ppm SO$_2$ was passed at a superficial gas velocity of 1 m/sec through a Moredana plate tower, comprising three perforated plates having a hole diameter of 5 mm and a free-space ratio of 0.31, where it was treated with 5 wt.% Na$_2$CO$_3$ in a water solution under L/G of 3.78. The rate of absorption was 92.7%.

It will be understood that the absorption method of this invention has the remarkable effect of increasing the rate of absorption and gas treating capacity when the results of Example 1 are compared with Comparative Example 1.

EXAMPLE 2

Gas containing 200 ppm nitrogen oxide (NO$_x$) was continuously passed through a Moredana plate tower (the diameter of the tower was 400 mm) comprising fifteen perforated plates, having a hole diameter of 5 mm and a free-space ratio of 0.30, where it was treated with 5 wt.% sodium chlorite (NaClO$_2$) in a water solution. The NaClO$_2$ solution fell downwardly in countercurrent flow relationship to the upflowing gas in the tower under the following conditions.

| | |
|---|---|
| Superficial gas velocity in the tower | 3 m/sec |
| Liquid flow rate | 30,000 kg/m².hr |
| L/G | 2.2 |

The rate of absorption obtained by $NO_x$ concentration in off-gas from the tower was 85%, and the total pressure drop through the tower was approximately 300 mm $H_2O$ in the operation.

Comparative Example 2

Gas containing 200 ppm $NO_x$ was treated in the same way as mentioned in Example 2 except that a Moredana plate tower (the diameter of the tower was 400 mm), comprising 15 perforated plates having a hole diameter of 5 mm and a free-space ratio of 0.20, was employed and the superficial gas velocity was 1 m/sec and the liquid flow rate was 20,000 kg/m²·hr. Approximately 60% of $NO_x$ was removed.

EXAMPLE 3

Flue gas containing approximately 0.5 g/Nm³ of dust having a diameter of 0.05 – 5 micron was continuously passed through a plate tower comprising two perforated plates, having a hole diameter of 5 mm and a free-space ratio of 0.25, where it was treated with industrial water. The water fell downwardly in countercurrent flow relationship to the upflowing gas in the tower under the following conditions.

| | |
|---|---|
| Superficial gas velocity in the tower | 3.0 m/sec |
| Gas inlet temperature | 200°C |
| Water flow rate | 20,000 kg/m².hr |
| Water inlet temperature | 40°C |
| L/G | 1.48 |

The rate of dust-removal obtained by the amount of the dust in off-gas from the tower was 98% and the total pressure drop through the tower was approximately 50 mm$H_2O$.

It will be highly appreciated as an excellent dust-removal process for preventing air pollution that hydrophobic dust having a diameter below 2 micron which has been generally difficult to remove by the conventional process can be removed at such a high rate.

EXAMPLE 4

Gas containing 25,000 ppm $H_2S$ was continuously passed through a Moredana plate tower comprising four perforated plates, having a hole diameter of 5 mm and a free-space ratio of 0.30, where it was treated with 10 wt.% sodium hydroxide (NaOH) in a water solution. The NaOH solution fell downwardly in countercurrent flow relationship to the upflowing gas in the tower under the following conditions.

| | |
|---|---|
| Superficial gas velocity | 3.54 m/sec |
| Liquid flow rate | 20,000 kg/m².hr |
| L/G | 1.25 |

The concentration of $H_2S$ in off-gas from the tower was 5 ppm and the total pressure drop through the tower was approximately 120 mm$H_2O$ during the operation.

EXAMPLE 5

Gas containing 1,330 ppm $SO_2$ was passed at a superficial gas velocity of 5.8 m/sec through a Moredana plate tower, comprising three perforated plates having a hole diameter of 8 mm and a free-space ratio of 0.49, where it was treated with 5 wt.% $Na_2CO_3$ in a water solution. The $Na_2CO_3$ solution fell downwardly in countercurrent flow relationship to the upflowing gas in the tower at a liquid flow rate of 20,000 kg/m²·hr.

The concentration of $SO_2$ in off-gas from the tower was 8 ppm and the total pressure drop through the tower was approximately 188 mm$H_2O$ in the operation.

What we claim is:

1. A process for removing a specific gas component and/or fine dust particles from a gas which comprises passing said gas containing the specific gas component and/or find dust particles upwardly through a plate tower comprising at least one perforated or grid plate without weir and downcomer, said plate having a free-space rate. (Fc) in the range from 0.25 to 0.60 and passing said gas through the tower at a superficial gas velocity within a range from 3 to 5.8 m/sec, and simultaneously passing a liquid absorbent downwardly through said plate tower at a liquid flow rate of not less than about 9300 kg/m²·hr, said liquid flow rate increasing as the free space ratio increases to not less than about 17,100 kg/m²·hr at a free space ratio of 0.60, wherein the liquid flows in a counter current flow relationship to the upflowing gas, the liquid to gas ratio (L/G) being in the range from 0.5 to 25.

2. The process as claimed in claim 1, wherein said freespace ratio of the plate is between 0.30 and 0.50.

3. The process of claim 1 wherein the liquid to gas ratio (L/G) is in the range of 1 to 3.

* * * * *